United States Patent
Cahill et al.

(10) Patent No.: US 10,518,758 B2
(45) Date of Patent: Dec. 31, 2019

(54) EMERGENCY PARK BRAKE SYSTEM

(71) Applicant: GOODRICH CORPORATION, Charlotte, NC (US)

(72) Inventors: Eric Daniel Cahill, Troy, OH (US); David B. Stein, Troy, OH (US); Paul R. Burte, Clayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 151 days.

(21) Appl. No.: 15/490,563

(22) Filed: Apr. 18, 2017

(65) Prior Publication Data

US 2018/0297563 A1    Oct. 18, 2018

(51) Int. Cl.
 *B60T 8/17* (2006.01)
 *B60T 13/74* (2006.01)
 *B60T 17/22* (2006.01)

(52) U.S. Cl.
 CPC .......... *B60T 8/1703* (2013.01); *B60T 13/741* (2013.01); *B60T 17/221* (2013.01); *B60T 2270/413* (2013.01)

(58) Field of Classification Search
 CPC ............. B60T 8/1703; B60T 2270/413; B60T 17/221; B60T 13/741
 See application file for complete search history.

(56) References Cited

U.S. PATENT DOCUMENTS

| | | | |
|---|---|---|---|
| 8,112,213 B2 | 2/2012 | Cahill et al. | |
| 9,227,608 B2 | 1/2016 | Hill et al. | |
| 2010/0228430 A1* | 9/2010 | Cahill | B60T 8/1703 701/29.2 |
| 2010/0276988 A1* | 11/2010 | Cahill | B60T 8/1703 303/20 |
| 2011/0018337 A1 | 1/2011 | King et al. | |
| 2011/0226569 A1 | 9/2011 | Devlieg | |
| 2014/0156160 A1* | 6/2014 | DeVlieg | B60T 8/00 701/70 |
| 2016/0059956 A1 | 3/2016 | Cahill | |

FOREIGN PATENT DOCUMENTS

| | | |
|---|---|---|
| DE | 19510525 | 9/1996 |
| EP | 2284054 | 2/2011 |
| EP | 2615005 | 7/2013 |
| GB | 2469891 | 11/2010 |

OTHER PUBLICATIONS

European Patent Office, European Search Report dated Sep. 21, 2018 in Application No. 18168036.4-1010.

* cited by examiner

*Primary Examiner* — Khoi H Tran
*Assistant Examiner* — Rodney P King
(74) *Attorney, Agent, or Firm* — Snell & Wilmer L.L.P.

(57) ABSTRACT

An emergency park brake system of an aircraft may include a user input interface configured to receive actuation input from a user. The emergency park brake system may also include a first displacement sensor and a second displacement sensor that are both coupled to the user input interface. The first displacement sensor may be configured to detect displacement of the user input interface and generate a first status of the user input interface and the second displacement sensor may be configured to also detect displacement of the user input interface and generate a second status of the user input interface. The emergency park brake system may also include a controller having a processor and memory. The controller may be configured to determine an emergency park brake condition.

16 Claims, 4 Drawing Sheets

EMERGENCY PARK BRAKE SYSTEM

FIELD

The present disclosure relates to aircraft systems, and more specifically, to emergency park brake systems.

BACKGROUND

Aircraft typically have brakes on the wheels to slow the aircraft during aborted takeoffs, landings, and/or while taxiing. Additionally, some aircraft employ emergency park brake systems that execute emergency braking and/or maintain a braking force while the aircraft is parked. Conventional brake systems generally include a mechanical linkage (e.g., a cable) that extends between a user brake interface (e.g., a pedal or a handle) and a braking force actuator. These conventional mechanical linkage systems, however, can be difficult and complex to implement. While electrical configurations can be implemented to replace and solve the complexities of the mechanical linkage configurations, conventional electrical configurations can be susceptible to uncommanded braking. For example, unintentionally executed, undesired, or uncommanded braking, whether due to user error or component failure, may result in the application of a braking force on the wheels of an aircraft at inopportune times (e.g., during takeoff).

SUMMARY

In various embodiments, the present disclosure provides an emergency park brake system of an aircraft. The emergency park brake system includes a user input interface, a first displacement sensor, a second displacement sensor, and an emergency park brake controller, according to various embodiments. The user input interface may be configured to receive actuation input from a user. The first displacement sensor may be coupled to the user input interface and the first displacement sensor may be configured to detect displacement of the user input interface and generate a first status of the user input interface. The second displacement sensor may also be coupled to the user input interface and the second displacement sensor may be configured to detect displacement of the user input interface and generate a second status of the user input interface.

In various embodiments, the emergency park brake controller is configured to perform various operations. The various operations include receiving, by the processor, the first status of the user input interface and the second status of the user input interface, according to various embodiments. The operations further include comparing, by the processor, the first status of the user input interface with the second status of the user input interface to yield comparison data, according to various embodiments. The operations further include, according to various embodiments, determining, by the processor and based on the comparison data, an emergency park brake condition.

In various embodiments, determining the emergency park brake condition includes determining whether the comparison data has a threshold difference between the first status of the user input interface and the second status of the user input interface. In various embodiments, the emergency park brake condition indicates an operative condition in response to the comparison data being less than the threshold difference. In various embodiments, the emergency park brake condition indicates a failure condition in response to the comparison data being greater than the threshold difference.

In various embodiments, in response to the emergency park brake condition indicating the failure condition, the operations include displaying an indicator on a display device of the failure condition. In various embodiments, the threshold difference is about 5%. In various embodiments, the threshold difference is about 3%. In various embodiments, the emergency park brake condition is a first emergency park brake condition, wherein the operations further include determining, by the processor and based on the first status of the user input interface and the second status of the user input interface, a second emergency park brake condition.

In various embodiments, determining the second emergency park brake condition is based on the first emergency park brake condition. For example, determining the second emergency park brake condition may be performed in response to the first emergency park brake condition indicating an operative condition. In various embodiments, determining the second emergency park brake condition includes comparing a displacement of the user input interface, indicated by the first status of the user input interface and the second status of the user input interface, with a threshold displacement. In various embodiments, the operations further include determining whether the displacement of the user input interface is greater than the threshold displacement. In various embodiments, the second emergency park brake condition indicates a null demand in response to the displacement of the user input interface being less than the threshold displacement. In various embodiments, the second emergency park brake condition indicates a braking demand in response to the displacement of the user input interface being greater than the threshold displacement. In various embodiments, the threshold displacement is about 20% from a zero position to a maximum displacement position.

Also disclosed herein, according to various embodiments, is an emergency park brake system of an aircraft. The emergency park brake system may include a user input interface, a first displacement sensor, a second displacement sensor, an emergency park brake controller, and a tangible, non-transitory memory. The user input interface may be configured to receive actuation input from a user. The first and second displacement sensors may be coupled to the user input interface, the first displacement sensor may be configured to detect displacement of the user input interface and generate a first status of the user input interface, and the second displacement sensor may be configured to detect displacement of the user input interface and generate a second status of the user input interface. In various embodiments, the emergency park brake controller includes a processor and the memory may be configured to communicate with the processor. The memory may have instructions stored thereon that, in response to execution by the processor, cause the emergency park brake system to perform various operations. These operations may include receiving, by the processor, the first status of the user input interface and the second status of the user input interface. The operations may include comparing, by the processor, the first status of the user input interface with the second status of the user input interface to yield comparison data. The operations may further include determining a first emergency park brake condition based on whether the comparison data yields a threshold difference between the first status of the user input interface and the second status of the user input interface and determining, by the processor and based on the first emergency park brake condition, a second emergency park brake condition.

Also disclosed herein, according to various embodiments, is a method of controlling an emergency park brake system of an aircraft. The method may include receiving, by an emergency park brake controller, a first status of a user input interface from a first displacement sensor and a second status of the user input interface from a second displacement sensor. The method may also include comparing, by the emergency park brake controller, the first status of the user input interface with the second status of the user input interface to yield comparison data. The method may further include determining, by the emergency park brake controller and based on the comparison data, an emergency park brake condition.

In various embodiments, determining the emergency park brake condition includes determining whether the comparison data includes a threshold difference between the first status of the user input interface and the second status of the user input interface. In various embodiments, the emergency park brake condition is a first emergency park brake condition, wherein the method further comprises determining, by the emergency park brake controller and based on the first emergency park brake condition, a second emergency park brake condition. In various embodiments, determining the second emergency park brake condition is performed in response to the first emergency park brake condition indicating an operative condition.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Figure 1A:
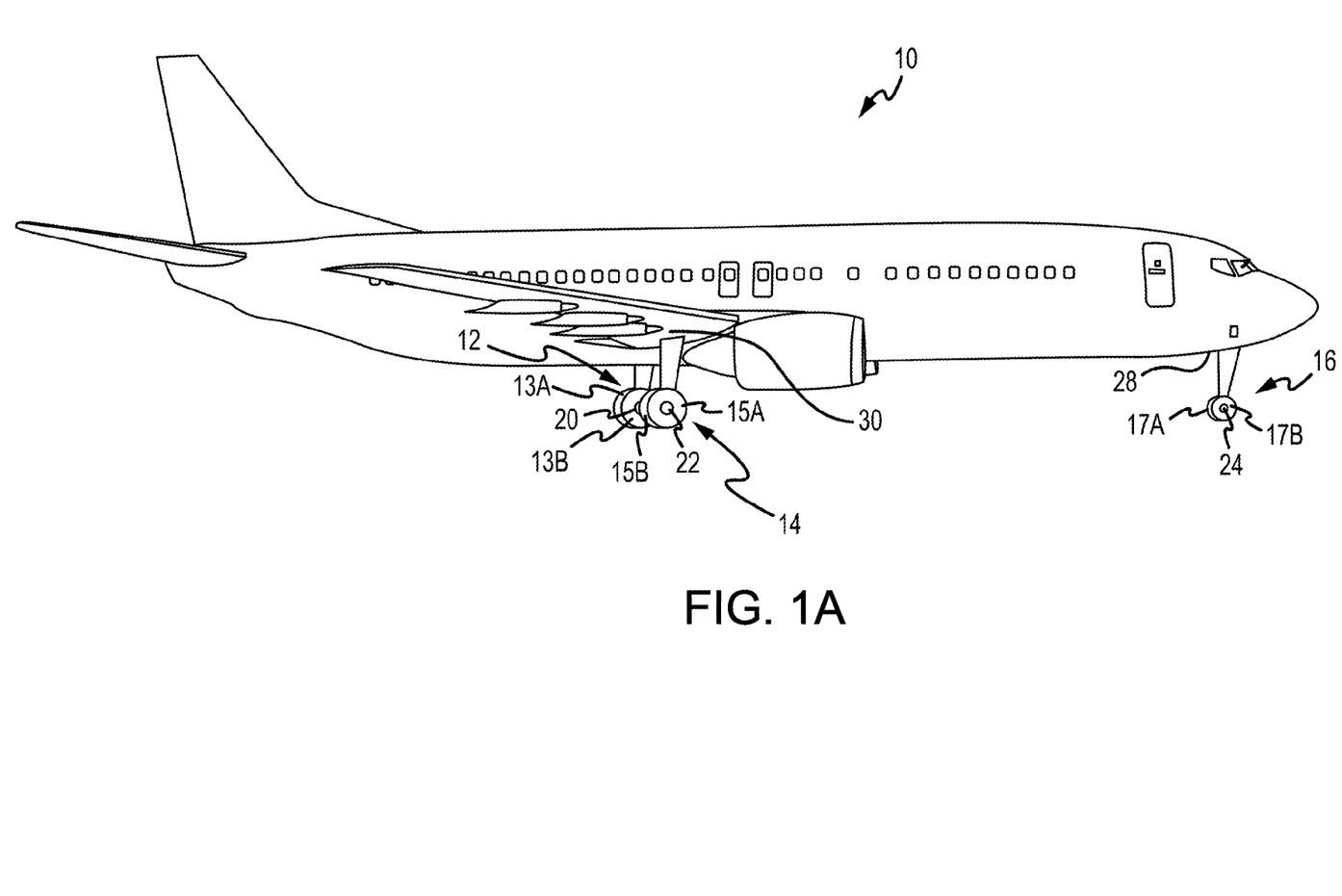
FIG. 1A illustrates an exemplary aircraft having an emergency park brake system, in accordance with various embodiments.

Referring now to FIG. 1A, in accordance with various embodiments, an aircraft 10 may include landing gear such as main landing gear 12, main landing gear 14 and nose landing gear 16. Main landing gear 12, main landing gear 14, and nose landing gear 16 may generally support aircraft 10 when aircraft 10 is not flying, allowing aircraft 10 to taxi, take off and land without damage. Main landing gear 12 may include wheel 13A and wheel 13B coupled by an axle 20. Main landing gear 14 may include wheel 15A and wheel 15B coupled by an axle 22 and may be located proximate the wings 30 of the aircraft 10. Nose landing gear 16 may be located at the nose 28 of the aircraft 10 and may include nose wheel 17A and nose wheel 17B coupled by an axle 24. In various embodiments, aircraft 10 may comprise any number of landing gears and each landing gear may comprise any number of wheels. Main landing gear 12, main landing gear 14, and nose landing gear 16 may each be retracted for flight.

Aircraft 10 may also include a primary brake system, which may be applied to a wheel of a landing gear. The primary brake system of aircraft 10 may comprise a collection of subsystems that produce output signals for controlling the braking force and/or torque applied at each wheel (e.g., wheel 13A, wheel 13B, wheel 15A, wheel 15B, etc. wheel 17A, and/or wheel 17B). The primary brake system may communicate with the brakes of each landing gear (e.g., main landing gear 12, main landing gear 14, and/or nose landing gear 16), and each brake may be mounted to each wheel to apply and release braking force on one or more wheels (e.g., as described above). The brakes of an aircraft 10 may include a non-rotatable wheel support, a wheel (e.g., wheel 13A, wheel 13B, wheel 15A, wheel 15B, wheel 17A, and/or wheel 17B) mounted to the wheel support for rotation, and a brake disk stack.

Figure 1B:
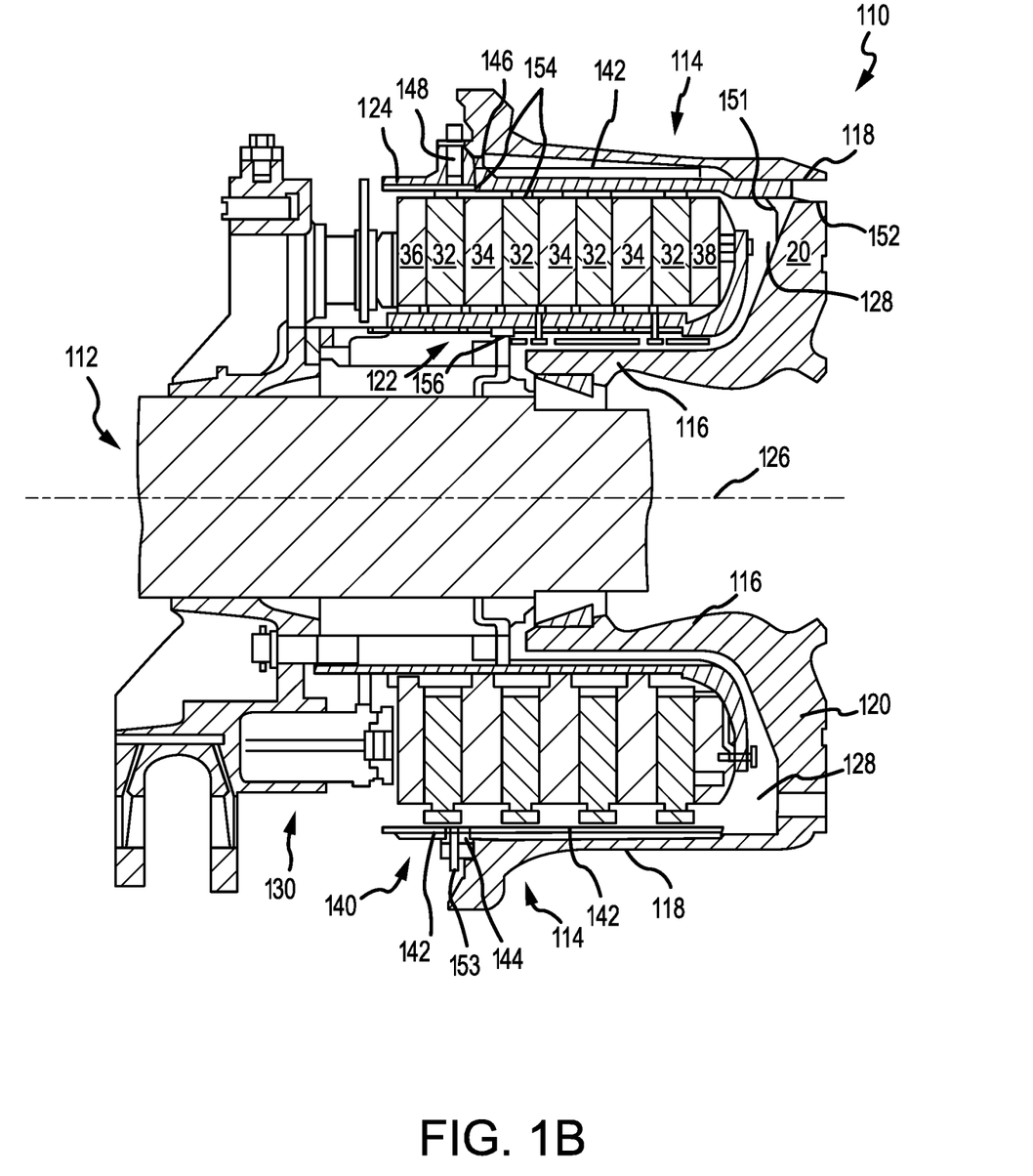
FIG. 1B illustrates a cross-sectional view of a brake assembly, in accordance with various embodiments.

Referring to FIG. 1B, brake assembly 110 may be found on an aircraft, in accordance with various embodiments. Brake assembly 110 may, for example, comprise a bogie axle 112, a wheel 114 including a hub 116 and a wheel well 118, a web 120, a torque take-out assembly 122, one or more torque bars 124, a wheel rotational axis 126, a wheel well recess 128, an actuator 130, multiple brake rotors 32, multiple brake stators 34, a pressure plate 36, an end plate 38, a heat shield 140, multiple heat shield sections 142, multiple heat shield carriers 144, an air gap 146, multiple torque bar bolts 148, a torque bar pin 151, a wheel web hole 152, multiple heat shield fasteners 153, multiple rotor lugs 154, and multiple stator slots 156.

Brake disks (e.g., interleaved rotors 32 and stators 34) are disposed in wheel well recess 128 of wheel well 118. Rotors 32 are secured to torque bars 124 for rotation with wheel 114, while stators 34 are engaged with torque take-out assembly 122. At least one actuator 130 is operable to compress interleaved rotors 32 and stators 34 for stopping the aircraft. In this example, actuator 130 is shown as a hydraulically actuated piston. Pressure plate 36 and end plate 38 are disposed at opposite ends of the interleaved rotors 32 and stators 34. Rotors 32 and stators 34 can comprise any material suitable for friction disks, including ceramics or carbon materials, such as a carbon/carbon composite.

Through compression of interleaved rotors 32 and stators 34 between pressure plates 36 and end plate 38, the resulting frictional contact slows, stops, and/or prevents rotation of wheel 114. Torque take-out assembly 122 is secured to a stationary portion of the landing gear truck such as a bogie beam or other landing gear strut, such that torque take-out assembly 122 and stators 34 are prevented from rotating during braking of the aircraft.

Figure 2:
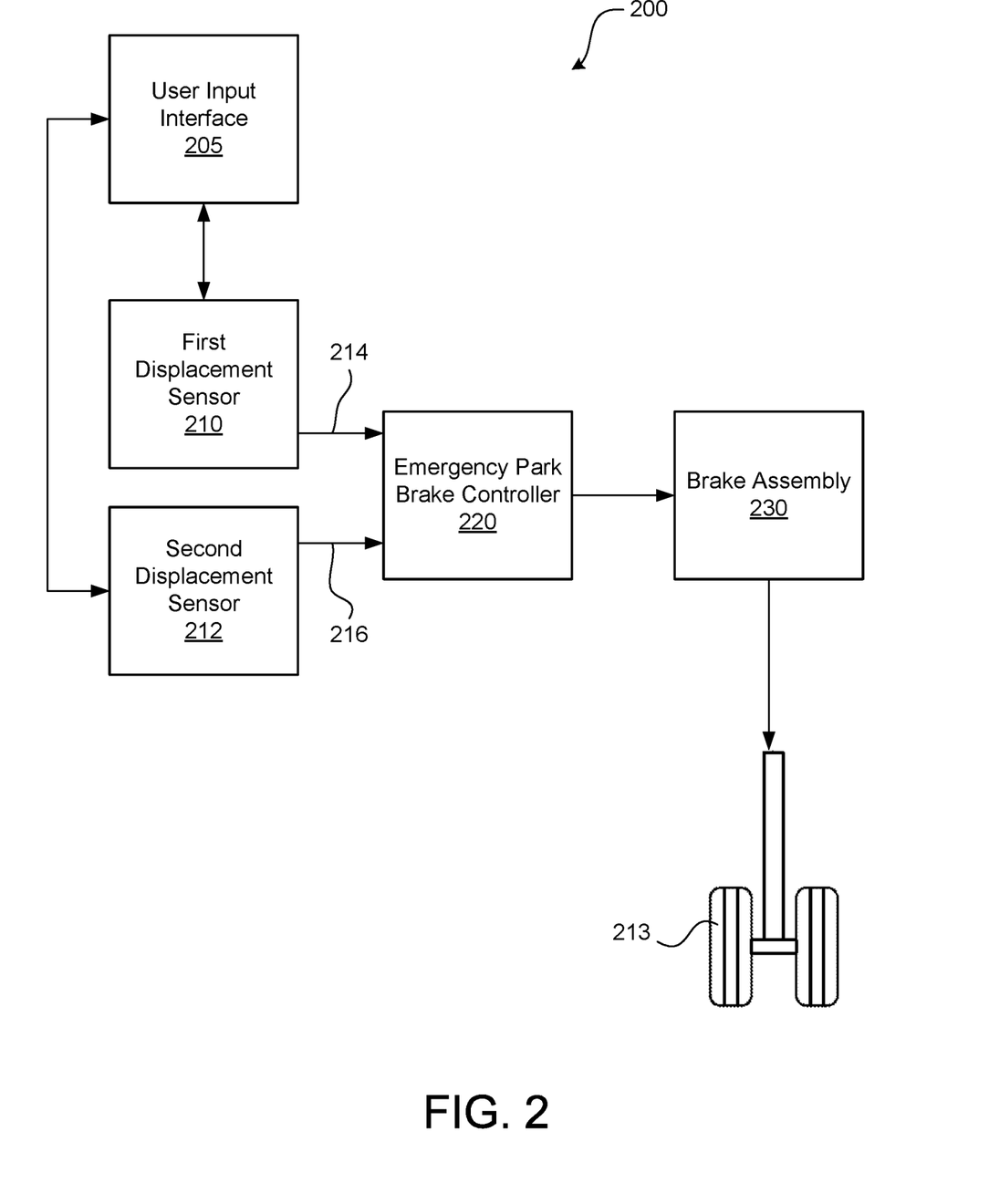
FIG. 2 illustrates a schematic of an emergency park brake system, in accordance with various embodiments.

In various embodiments, and with reference to FIG. 2, aircraft 10 may also include one or more emergency park brake systems 200. The emergency park brake systems 200 of aircraft 10 may include a user input interface 205, a first displacement sensor 210, a second displacement sensor 212, an emergency park brake controller 220, a brake assembly 230 (which may be similar to brake assembly 110), and a wheel 213. As described in greater detail below, the emergency park brake system 200 generally controls an emergency or parking braking force/torque that is applied and implemented via the brake assembly 230 to each wheel 213, according to various embodiments. The emergency park brake system 200 may be separate from, for example, a primary brake system. In various embodiments, the brake assembly 230 may be shared with a primary brake system (as described in greater detail below) while the remaining components 205, 210, 212, 220 of the emergency park brake system 200 are not shared with the primary brake system and are thus unique to the emergency park brake system 200.

The brake assembly 230 may employ fluid powered (hydraulic or pneumatic power) actuator rams or electromechanical actuator arms. For example, the brake assembly 230 may be a hydraulic assembly and thus may be coupled to a power source via a brake servo valve (BSV) and a shutoff valve (SOV). The SOV may effectively function as a shutoff valve such that in response to the valve being in the first position (e.g., an armed position), fluid pressure is permitted to pass through the valve while in response to the valve being in a second position (e.g., a disarmed position), fluid pressure is restricted or prevented from passing through the valve. In various embodiments, the brake assembly 230 is electric and includes an electromechanical actuator controller (EMAC) to control braking. Generally, the brake system 200 receives user actuation input via the user input interface 205, as detected by the first displacement sensor 210 and the second displacement sensor 212, and the emergency park brake controller 220 controls the amount of fluid pressure or electromechanical force provided to the actuator ram, thus applying a braking force to the wheel 213.

The emergency park brake controller 220 is generally configured to receive input from the first displacement sensor 210 and the second displacement sensor 212, as described in greater detail below, and translate the input into a command to be sent to the brake assembly 230, according to various embodiments. The emergency park brake controller 220 may be integrated into computer systems onboard aircraft 10 such as, for example, a brake control unit (BCU), a full authority digital engine control (FADEC), an engine-indicating and crew-alerting system (EICAS), and/or the like. The emergency park brake controller 220 may also be a standalone computer system separate from aircraft 10 and in electronic communication with aircraft 10, as described in further detail herein. The emergency park brake controller 220 may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, the processor of the emergency park brake controller 220 may be configured to implement various logical operations in response to execution of instructions, for example, instructions stored on the non-transitory memory (e.g., tangible, computer-readable medium). As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. § 101.

In various embodiments, the one or more user input interfaces 205 of the emergency park brake system 200 are configured to receive actuation/input from a user. For example, the user input interface 205 may be an emergency brake handle, level, or other movable mechanical component, that is integrated within a cockpit of the aircraft 10. In various embodiments, the user input interface is separate from the cockpit. For example, the user input interface 205 may be a remote button (e.g., unmanned aircraft) or other user interface that is suitable for being actuated by a user.

The first displacement sensor 210 and the second displacement sensor 212, according to various embodiments, are both coupled to the user input interface 205 and are both configured to detect displacement of the user input interface 205 from a neutral or "zero" position and communicate the detected displacement to the emergency park brake controller 220. In various embodiments, the first displacement sensor 210 generates a first status 214 of the user input interface 205 that is indicative of the detected displacement and the second displacement sensor 212 generates a second status 216 of the user input interface 205 that is also indicative of the detected displacement. Accordingly, in various embodiments, the emergency park brake system 200 includes redundant displacement sensors 210, 212.

The displacement sensors 210, 212 may include any suitable sensor, such as, for example, a linear variable differential transformer (LVDT), a rotary variable differential transformer (RVDT), a potentiometer, a magnetic encoder, and/or the like. The first displacement sensor 210 and the second displacement sensor 212 may generate and transmit the first status 214 and the second status 216, respectively, as a variable brake signal (e.g., representative of a percentage of displacement of the user input interface 205 from a zero, reference position to a maximum reference position).

The emergency park brake controller 220 may be configured to receive (e.g., by the processor) the first status 214 of the user input interface 205 from the first displacement sensor 210 and the second status 216 of the user input interface 205 from the second displacement sensor 212. The emergency park brake controller 220 may be configured to compare the first status 214 of the user input interface 205 with the second status 216 of the user input interface 205 to yield/produce comparison data. The emergency park brake controller 220 may determine an emergency park brake condition based on the comparison data. That is, the emergency park brake controller 220 is configured to determine whether the comparison data comprises a threshold difference between the first status 214 and the second status 216, according to various embodiments.

For example, if the first status 214 reported by the first displacement sensor 210 is substantially different than the second status 216 reported by the second displacement sensor 212 (e.g., the reported difference is greater than the predetermined threshold difference), the emergency park brake condition generated by the emergency park brake controller 220 indicates a failure condition, according to various embodiments. The failure condition may indicate that one of the displacement sensors 210, 212 has failed, since both displacement sensors 210, 212 are coupled to the user input interface 205 and both are configured to detect and report displacement of the user input interface 205. In response to determining a failure condition, the emergency park brake controller 220 does not transmit a braking command to the brake assembly 230 (due to the inconsistency of the displacement values being reported by the two displacement sensors 210, 212) and the operations of the emergency park brake controller 220 may include notifying a user of the failure condition, according to various embodiments. For example, notifying the user of the failure condition may include displaying an indicator on a display device. By notifying the user of the failure condition, the user may inspect the emergency park brake system 200 and replace any broken, damaged, or failing components.

In various embodiments, the threshold difference is about 5%. In various embodiments, the threshold difference is about 4%. In various embodiments, the threshold difference is about 3%. As used in the instant context, the term "about" refers to plus or minus 0.25%.

If, however, the first status 214 reported by the first displacement sensor 210 is substantially the same as the second status 216 reported by the second displacement sensor 212 (e.g., the reported difference is less than or equal to the predetermined threshold difference), the emergency park brake condition generated by the emergency park brake controller 220 indicates an operative condition, according to various embodiments. In response to the emergency park brake controller 220 determining an operative condition, a braking command may be transmitted to the brake assembly 230. Accordingly, implementing redundant displacement sensors 210, 212 prevents an uncommanded braking force from being applied via the brake assembly 230 in the event of failure of one of the displacement sensors 210, 212, according to various embodiments.

In various embodiments, the emergency park brake condition (e.g., either an operative condition or a failure condition) is a first emergency park brake condition and the emergency park brake controller 220 is further configured to determine a second emergency park brake condition. In various embodiments, the second emergency park brake condition is based on the first status 214 of the user input interface 205 reported by the first displacement sensor 210 and/or the second status 216 of the user input interface 205 reported by the second displacement sensor 212. In various embodiments, the second emergency park brake condition indicates whether the detected displacement of the user input interface 205 is greater than a threshold displacement. Said differently, the emergency park brake controller 220 may be configured to compare the detected displacement of the user input interface 205 with the threshold displacement. The threshold displacement may refer to a predetermined minimum displacement value (e.g., a "deadband" threshold). For example, if the detected displacement of the user input interface 205 is less than the threshold displacement, the emergency park brake controller 220 may generate and/or transmit a null demand to the brake assembly 230. That is, if the user input interface 205 has not been actuated or if the user input interface 205 is not sufficiently actuated (displaced), no braking command may be sent by the emergency park brake controller 220 to the brake assembly 230, according to various embodiments. However, if the user input interface 205 is sufficiently actuated (displaced) beyond the threshold displacement, a braking demand/command may be transmitted, by the emergency park brake controller 220 to the brake assembly 230.

In various embodiments, the threshold displacement is about 20% from a zero position of the user input interface 205 to a maximum displacement position of the user input interface 205. In various embodiments, the threshold displacement is about 15% from a zero position of the user input interface 205 to a maximum displacement position of the user input interface 205. In various embodiments, the threshold displacement is about 10% from a zero position of the user input interface 205 to a maximum displacement position of the user input interface 205. As used in the instant context, the term "about" refers to plus or minus 1.0%.

In various embodiments, determining the second emergency park brake condition is based on the first emergency park brake condition. For example, determining the second park brake condition may be performed by the emergency park brake controller 220 in response to (e.g., after) the determination of the first emergency park brake condition. In various embodiments, the emergency park brake controller 220 is only configured to determine the second emergency park brake condition if the first emergency park brake condition indicates an operative condition (e.g., the second emergency park brake condition may only be determined after the first displacement sensor 210 and the second displacement sensor 212 are confirmed to be functioning properly).

In various embodiments, sending a braking command to the brake assembly 230 may include transmitting a signal to a shutoff valve (SOV) so that fluid/hydraulic pressure is permitted to pass through the SOV. Sending a braking command to the brake assembly 230 may also include sending a variable command signal to a brake servo valve (BSV) to control the braking force applied to the wheels 213. In various embodiments, the SOV and the BSV may be shared components with a primary brake system. In various embodiments, for example, a shuttle valve may be disposed between the primary brake system and the emergency park brake system to determine which system is operating the brake assembly 230.

Figure 3:
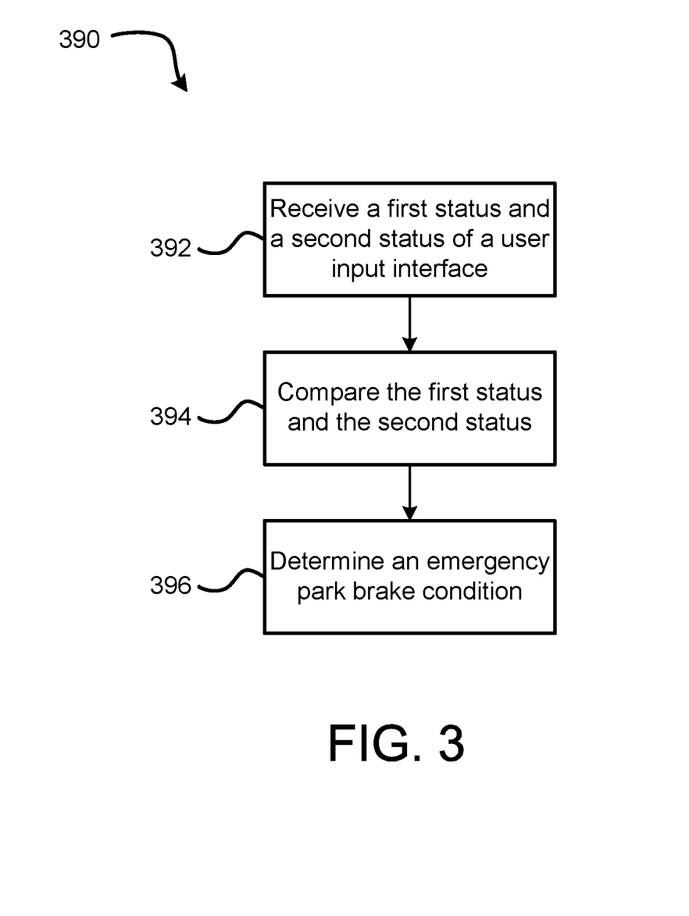
FIG. 3 is a schematic flow chart diagram of a method of controlling an emergency park brake system, in accordance with various embodiments.

In various embodiments, and with reference to FIG. 3, a method 390 of controlling an emergency park brake system is provided. The method 390 may include receiving a first status and a second status of a user input interface at step 392. For example, an emergency park brake controller may receive the first status of the user input interface from a first displacement sensor and the emergency park brake controller may also receive the second status of the user input interface from a second displacement sensor. The method 390 may further include comparing the first status and the second status at step 394. In various embodiments, comparing the first status of the user input interface with the second status of the user input interface yields comparison data. The method 390 may further include determining an emergency park brake condition at step 396. Determining the emergency park brake condition (step 396) may be performed by the emergency park brake controller 220 and may be based on the comparison data.

In various embodiments, determining the emergency park brake condition at step 396 includes determining whether the comparison data comprises a threshold difference between the first status of the user input interface and the second status of the user input interface. The method may also include an additional step of determining, by the emergency park brake controller and based on the emergency park brake condition (e.g., the "first" emergency park brake condition), a second emergency park brake condition. The second park brake condition is performed in response to determining the first emergency park condition, according to various embodiments. For example, in various embodiments, determining the second emergency park brake condition is performed in response to the first emergency park brake condition indicating an operative condition.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Also, any reference to attached, fixed, connected, coupled or the like may include permanent (e.g., integral), removable, temporary, partial, full, and/or any other possible attachment option. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An emergency park brake system of an aircraft, the emergency park brake system comprising:
   a user input interface configured to receive actuation input from a user;
   a first displacement sensor coupled to the user input interface, the first displacement sensor configured to detect displacement of the user input interface and generate a first status of the user input interface;
   a second displacement sensor coupled to the user input interface, the second displacement sensor configured to detect displacement of the user input interface and generate a second status of the user input interface; and
   an emergency park brake controller having a processor and configured to perform operations comprising:
      receiving, by the processor, the first status of the user input interface and the second status of the user input interface;
      comparing, by the processor, the first status of the user input interface with the second status of the user input interface to yield comparison data;
      determining, by the processor and based on the comparison data, an emergency park brake condition, wherein determining the emergency park brake condition comprises determining whether the comparison data comprises a threshold difference between the first status of the user input interface and the second status of the user input interface;
      in response to determining that the comparison data is less than the threshold difference and thus that the emergency park brake condition indicates an operative condition, transmitting, by the processor, a braking command to a braking assembly; and
      in response to determining that the comparison data is greater than the threshold difference and thus that the emergency park brake condition indicates a failure condition, not transmitting, by the processor, the braking command to the braking assembly.

2. The emergency park brake system of claim 1, wherein transmitting the braking command to the braking assembly comprises applying a braking force at a wheel.

3. The emergency park brake system of claim 1, wherein not transmitting the braking command to the braking assembly comprises preventing a braking force from being applied at a wheel.

4. The emergency park brake system of claim 3, wherein, in response to the emergency park brake condition indicating the failure condition, the operations comprise displaying an indicator on a display device of the failure condition.

5. The emergency park brake system of claim 1, wherein the threshold difference is about 5%.

6. The emergency park brake system of claim 1, wherein the threshold difference is about 3%.

7. The emergency park brake system of claim 1, wherein the emergency park brake condition is a first emergency park brake condition, wherein the operations further comprise determining, by the processor and based on the first status of the user input interface and the second status of the user input interface, a second emergency park brake condition.

8. The emergency park brake system of claim 7, wherein determining the second emergency park brake condition is based on the first emergency park brake condition.

9. The emergency park brake system of claim 8, wherein determining the second emergency park brake condition is only performed in response to the first emergency park brake condition indicating an operative condition.

10. The emergency park brake system of claim 7, wherein determining the second emergency park brake condition comprises comparing a displacement of the user input interface, indicated by the first status of the user input interface and the second status of the user input interface, with a threshold displacement.

11. The emergency park brake system of claim 10, wherein the operations further comprise determining whether the displacement of the user input interface is greater than the threshold displacement.

12. The emergency park brake system of claim 11, wherein the second emergency park brake condition indicates a null demand in response to the displacement of the user input interface being less than the threshold displacement.

13. The emergency park brake system of claim 11, wherein the second emergency park brake condition indicates a braking demand in response to the displacement of the user input interface being greater than the threshold displacement.

14. The emergency park brake system of claim 11, wherein the threshold displacement is from about 15% to about 20% from a zero position of the user input interface to a maximum displacement position.

15. An emergency park brake system of an aircraft, the emergency park brake system comprising:
a user input interface configured to receive actuation input from a user;
a first displacement sensor coupled to the user input interface, the first displacement sensor configured to detect displacement of the user input interface and generate a first status of the user input interface;
a second displacement sensor coupled to the user input interface, the second displacement sensor configured to detect displacement of the user input interface and generate a second status of the user input interface;
an emergency park brake controller having a processor; and
a tangible, non-transitory memory configured to communicate with the processor, the tangible, non-transitory memory having instructions stored thereon that, in response to execution by the processor, cause the emergency park brake system to perform operations comprising:
receiving, by the processor, the first status of the user input interface and the second status of the user input interface;
comparing, by the processor, the first status of the user input interface with the second status of the user input interface to yield comparison data;
determining, by the processor, a first emergency park brake condition based on whether the comparison data yields a threshold difference between the first status of the user input interface and the second status of the user input interface;
in response to determining that the comparison data is less than the threshold difference and thus that the first emergency park brake condition indicates an operative condition, transmitting, by the processor, a braking command to a braking assembly to apply a braking force at a wheel;
in response to determining that the comparison data is greater than the threshold difference and thus that the first emergency park brake condition indicates a failure condition, not transmitting, by the processor, the braking command to the braking assembly to prevent the braking force from being applied at the wheel;
determining, by the processor and based on the first emergency park brake condition, a second emergency park brake condition.

16. A method of controlling an emergency park brake system of an aircraft, the method comprising:
receiving, by an emergency park brake controller, a first status of a user input interface from a first displacement sensor and a second status of the user input interface from a second displacement sensor;
comparing, by the emergency park brake controller, the first status of the user input interface with the second status of the user input interface to yield comparison data; and
determining, by the emergency park brake controller and based on the comparison data, an emergency park brake condition, wherein determining the emergency park brake condition comprises determining whether the comparison data comprises a threshold difference between the first status of the user input interface and the second status of the user input interface;
in response to determining that the comparison data is less than the threshold difference and thus that the emergency park brake condition indicates an operative condition, transmitting, by the emergency park brake controller, a braking command to a braking assembly; and
in response to determining that the comparison data is greater than the threshold difference and thus that the emergency park brake condition indicates a failure condition, not transmitting, by the emergency park brake controller, the braking command to the braking assembly;
wherein the emergency park brake condition is a first emergency park brake condition, wherein the method further comprises determining, by the emergency park brake controller and based on the first emergency park brake condition, a second emergency park brake condition, wherein determining the second emergency park brake condition is only performed in response to the first emergency park brake condition indicating an operative condition.

\* \* \* \* \*